United States Patent
Fukuda

(10) Patent No.: US 9,422,186 B2
(45) Date of Patent: Aug. 23, 2016

(54) METHOD FOR DRAWING GRIN LENS FIBER

(75) Inventor: Toshiaki Fukuda, Kanagawa (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 775 days.

(21) Appl. No.: 13/257,410

(22) PCT Filed: Mar. 30, 2009

(86) PCT No.: PCT/JP2009/056439
§ 371 (c)(1),
(2), (4) Date: Sep. 19, 2011

(87) PCT Pub. No.: WO2010/116439
PCT Pub. Date: Oct. 14, 2010

(65) Prior Publication Data
US 2012/0017644 A1  Jan. 26, 2012

(51) Int. Cl.
*C03B 37/025* (2006.01)
*C03B 37/027* (2006.01)
*G02B 6/028* (2006.01)
*G02B 3/00* (2006.01)

(52) U.S. Cl.
CPC .......... *C03B 37/02772* (2013.01); *G02B 6/028* (2013.01); *C03B 2203/26* (2013.01); *C03B 2205/47* (2013.01); *G02B 3/0087* (2013.01)

(58) Field of Classification Search
CPC .................... C03B 37/02772; C03B 2205/47; C03B 2203/26
USPC .......................................................... 65/435
See application file for complete search history.

(56) References Cited

U.S. PATENT DOCUMENTS

| | | | | |
|---|---|---|---|---|
| 5,755,849 A | * | 5/1998 | Hoshino et al. | 65/381 |
| 5,788,734 A | * | 8/1998 | Hoshino et al. | 65/385 |
| 6,779,363 B1 | * | 8/2004 | Craft et al. | 65/384 |
| 2004/0055340 A1 | * | 3/2004 | DiGiovanni et al. | 65/415 |
| 2005/0132753 A1 | * | 6/2005 | Shimizu et al. | 65/381 |

FOREIGN PATENT DOCUMENTS

| | | |
|---|---|---|
| JP | 57-92533 | 6/1982 |
| JP | 2-92838 | 4/1990 |

(Continued)

OTHER PUBLICATIONS

Japanese Office Action issued Aug. 1, 2012 in corresponding Japanese Patent Application No. JP 2009-522259, together with English translation thereof.

(Continued)

*Primary Examiner* — Queenie Dehghan
(74) *Attorney, Agent, or Firm* — Wenderoth, Lind & Ponack, L.L.P.

(57) ABSTRACT

When drawing of a GRIN lens from a preform is started, wastage of the preform is reduced and the amount of time taken from the start of elongation of the preform to the start of winding is reduced. A preform, to a lower end of which a weight formed of silica is fused, is set in a heating furnace, and drawing of the preform is started by heating a fused portion where the preform and the weight are fused to each other. This can reduce wastage of the preform. Since an elongation speed of the preform is increased by the weight of the weight, the amount of time taken from the start of the elongation of the preform to the start of winding can be decreased.

11 Claims, 4 Drawing Sheets

(56) References Cited

FOREIGN PATENT DOCUMENTS

| | | |
|---|---|---|
| JP | 4-084838 | 3/1992 |
| JP | 2005-47754 | 2/2005 |
| JP | 2005-115097 | 4/2005 |
| JP | 2008-120643 | 5/2008 |

OTHER PUBLICATIONS

International Search Report issued May 19, 2011 in International (PCT) Application No. PCT/JP2009/056439.

* cited by examiner

METHOD FOR DRAWING GRIN LENS FIBER

BACKGROUND OF THE INVENTION (1) Field of the Invention

The present invention relates to a method for starting drawing of a GRIN lens fiber from a preform in a method for drawing the GRIN lens fiber, and in particular, relates to a method for reducing time taken to start drawing and decreasing an amount of wasted preform.

(2) Description of Related Art

A so-called GRIN fiber lens is a cylindrical graded index lens (GRaded INdex lens) having a refraction index distribution within a glass so as to bend a traveling direction of light, thereby realizing the function of the lens. Typically, the GRIN lens is cut into pieces of less than about 1 mm, each of which is welded to the tip of an optical fiber, and used in a variety of applications in optical systems for optical communications. Today, there is a demand for GRIN lenses having high NA (numerical aperture). Preforms of such GRIN lenses are fabricated in a sol-gel method as disclosed in Patent Document 1 below and the like. A preform 7 that is fabricated using the sol-gel method has a cylindrical shape whose diameter and length are respectively about 5 mm and about 30 to 50 mm at the minimum. This size is very small compared to that of a silica glass preform for an ordinary optical fiber.

FIG. 5 illustrates an example of a related-art for starting drawing of the GRIN lens fiber. In FIG. 5, a diagram on the left illustrates a state in which the preform 7 is set in a heater 2 of a heating furnace. At this time, the preform 7 is disposed such that the distance between a maximum temperature portion (a center of a heating portion of the heater 2) of the heating furnace and a lower end of the preform 7 is about 12 to 18 mm. The diagrams in the center and on the right illustrate a state in which the preform 7 is heated and starts to soften. A preform lower end portion 7a (part of the preform below the maximum temperature portion of the heater) starts to descend due to its own weight.

Patent Documents 2 and 3 below and the like disclose a technology for starting drawing of ordinary optical fiber preforms.

Patent Document 1: Japanese Unexamined Patent Application Publication No. 2005-115097
Patent Document 2: Japanese Unexamined Patent Application Publication No. 2005-47754
Patent Document 3: Japanese Unexamined Patent Application Publication No. 2008-120643

With the related-art method for starting drawing of the GRIN lens preform, 12 to 18 mm of the preform from the bottom is softened and elongated. Thus, at least about 15 to 21 mm (about ⅓ to ½ of the length of the preform) of the preform is not drawn and wasted. Since the GRIN lens preform is expensive and valuable, this is a significant loss in terms of the cost.

In addition, the preform having the length of 12 to 18 mm weighs about 0.5 to 0.8 g. Thus, a descending speed of the softened part is very slow, and accordingly, it requires a very long time before winding is started. In order to reduce the time taken before winding is started, a method in which the heating temperature is increased in order to decrease the viscosity of the preform seems useful. However, since the silica glass of the GRIN lens includes a dopant (such as titanium or tantalum that causes the GRIN lens to have a refraction index distribution), a change in viscosity relative to a temperature change is comparatively large. This may cause a fused and elongated portion to be cut or to become too thin to be wound up during heating, thereby wastage of the preform being increased.

The technology disclosed in the above-described Patent Documents 2 and 3 is used to start drawing of an ordinary optical fiber, and is not useful at all when drawing the GRIN lens preform, which is very small compared to the size of the preform of the optical fiber.

BRIEF DESCRIPTION OF THE INVENTION

An object of the present invention is to reduce wastage of the preform when drawing of the GRIN lens from the preform is started and to increase an elongation speed after elongation of the preform has started so as to reduce the amount of time taken from the start of the elongation to the start of winding, thereby allowing drawing of the GRIN lens fiber to be efficiently performed.

Means for Solving the Problems

The present invention is a method for drawing a GRIN lens fiber, in which a preform, to a lower end of which a weight formed of silica is fused, is set in a heating furnace, and drawing of the preform is started by heating a fused portion where the preform and the weight are fused to each other.

Since the weight is fused to the lower end of the preform and the fused portion where the preform and the weight are fused to each other is heated, wastage of the preform can be reduced by 12 to 15 mm compared to the related art case in which the preform without the weight is heated with the position of the preform 12 to 18 mm from the bottom set at the center. In addition, since the weight of the weight increases an elongation speed, the amount of time taken from the start of the elongation of the preform to the start of winding can be reduced.

The material of the weight may be silica glass or glass that has a softening temperature higher than that of the preform and a small coefficient of thermal expansion. The material can be fused to the preform and is not elongated before the preform is elongated when the material is heated in the heating furnace at the start of the drawing.

Specifically, the weight is preferably formed to have a rod shape whose section is circular.

Since the sectional shape of the preform is circular, the weight formed to have a circular sectional shape the same as the preform can be easily fused to the preform. By forming the weight to have a rod shape, the weight can be easily inserted into the heater of the heating furnace.

The weight suitably weighs 5 to 15 g.

When the weight is too light, effects of the weight reducing the amount of time from the start of the elongation of the preform to the start of winding of the preform decrease. When the weight is too heavy, an elongated portion of the preform may be cut.

When the preform is set in the heating furnace, the height difference t between the fused portion where the preform and the weight are fused to each other and a maximum temperature portion of the heating furnace is suitably −5 to 5 mm. More preferably, the preform may be disposed such that the fused portion where the preform and the weight are fused to each other is positioned above the maximum temperature portion of the heating furnace.

Thus, wastage of the preform can be further reduced.

In this case, specifically, the height difference t between the fused portion where the preform and the weight are fused to each other and the maximum temperature portion of the heating furnace is most suitably 1 to 3 mm.

Advantages

According to the present invention, wastage of the preform when drawing of the GRIN lens fiber from the preform is started is reduced and the elongation speed after elongation of the preform has started is increased, thereby allowing the amount of time taken from the start of the elongation to the start of winding to be reduced. Thus, drawing of the GRIN lens fiber can be efficiently performed and the cost can be significantly reduced.

Figure 1:
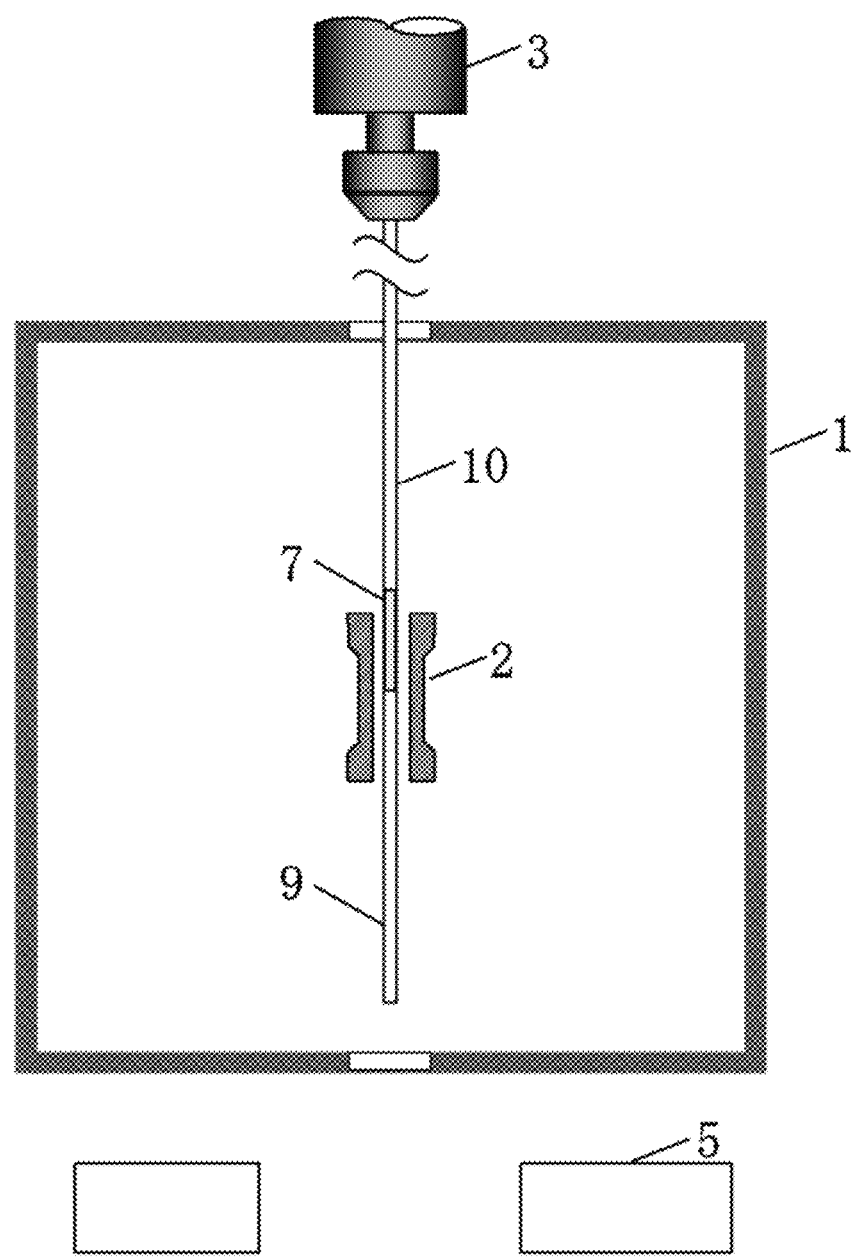
FIG. 1 is an explanatory view of equipment for drawing a GRIN lens fiber (when a preform is set).

REFERENCE NUMERALS 1 heating furnace
2 heater
3 ascending/descending device
4 winding drum
5 diameter measuring instrument
6 automatic controller
7 preform
8 GRIN lens fiber
9 weight
10 silica rod
11 fused portion

DETAILED DESCRIPTION OF THE INVENTION

Embodiment

Figure 4:
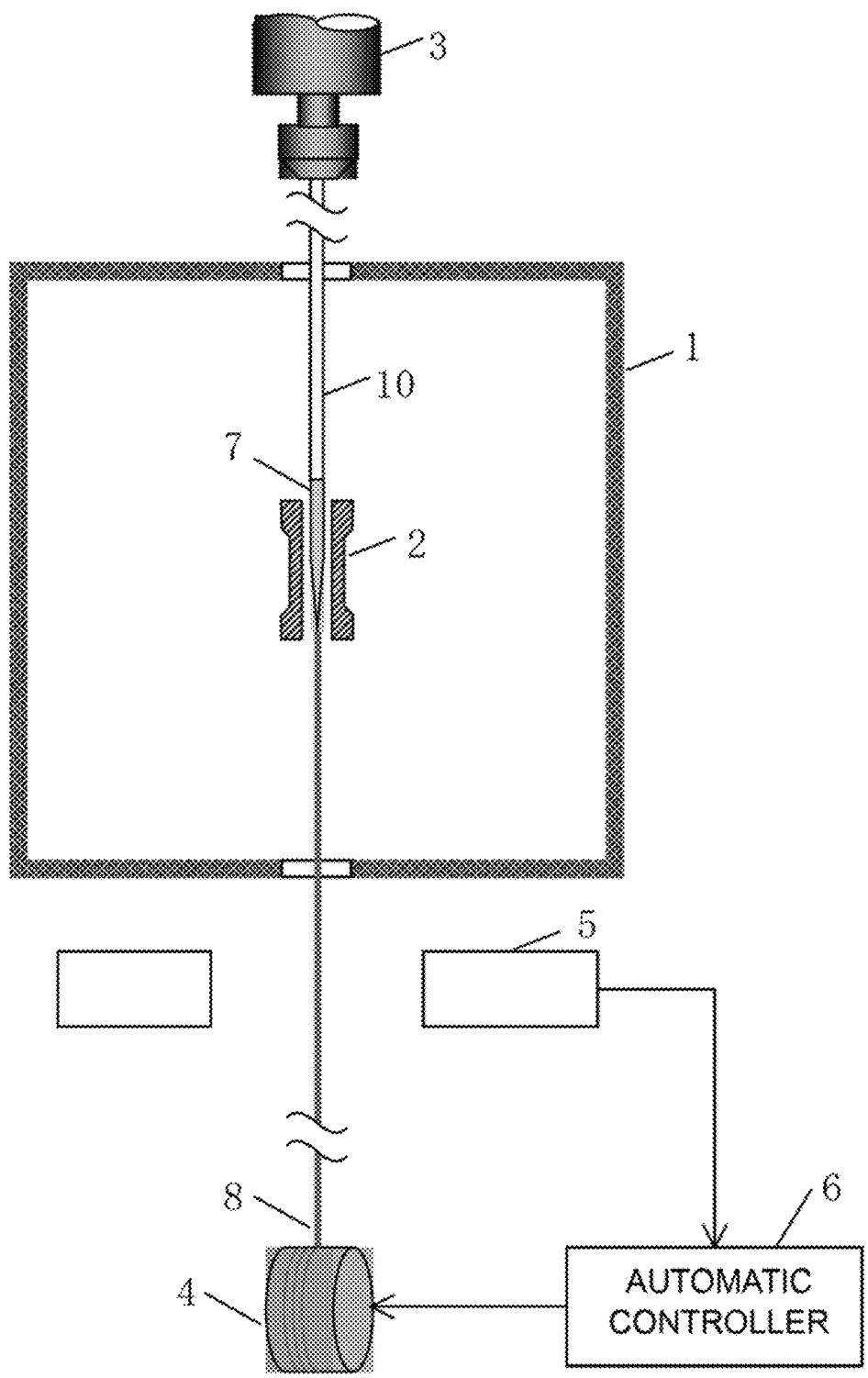
FIG. 4 is an explanatory view of the equipment for drawing a GRIN lens fiber (a schematic drawing of the equipment).
Figure 5:
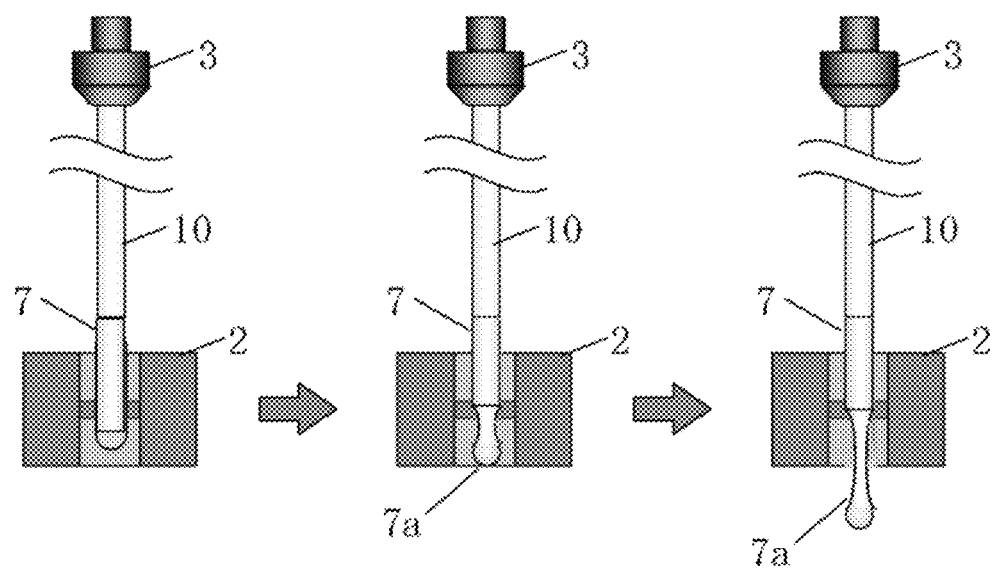
FIG. 5 is an explanatory view of a related-art method for starting drawing of the GRIN lens preform.

FIGS. 1 and 4 illustrate equipment for drawing a GRIN lens fiber. The drawing equipment includes a heating furnace 1, a heater 2, an ascending/descending device 3, a winding drum 4, a diameter measuring instrument 5, and an automatic controller 6.

The heating furnace 1 is a very high temperature vertical pipe furnace, the temperature of which can be increased up to 2100° C.

The winding drum 4 includes a horizontal movement mechanism that prevents a turn of a fiber from overlapping another turn of the fiber. In the present embodiment, a drawn GRIN lens fiber is directly wound using a winding drum 4. By controlling a rotation speed of the winding drum, a drawing speed is controlled. A capstan roller may be provided before the winding drum in order to control the drawing speed by controlling a rotation speed of the capstan roller.

Above the heating furnace 1, the ascending/descending device 3 is provided in order to hold and move up and down a preform 7.

A silica rod 10 is welded to one end (upper end) of the preform 7. A weight 9 is welded to the other end (lower end) of the preform 7. The silica rod 10 is a rod-shaped material formed of silica glass and has a diameter substantially the same as that of the preform. The silica rod 10 is used to adjust the length of the preform such that the small preform can be positioned inside the heater 2. The weight 9 is a rod-shaped material formed of silica glass and has a diameter substantially the same as that of the preform. The weight 9 is provided so as to allow a part of the preform to be drawn to quickly move down when a lower end part of the preform is heated and drawing is started. The weight of the weight 9 is suitably 5 to 15 g.

The measurement position of the diameter measuring instrument 5 is preferably a position closer to the exit of the heating furnace as much as possible.

A fiber diameter a from the diameter measuring instrument 5 is output to the automatic controller 6. The automatic controller 6 controls the rotation speed (drawing speed) of the winding drum such that the fiber diameter a becomes closer to a specified target value.

Next, the embodiment of a method for drawing the GRIN lens fiber according to the present invention will be sequentially described. The GRIN lens preform 7, which is formed using the sol-gel method and has a diameter of 5 mm and a length of 35 mm, is prepared. The silica rod 10 having a length of 550 mm is fused to the one end of the preform 7 and the weight 9 having a length of 230 mm and a weight of about 10 g is fused to the other end of the preform 7 using an oxyhydrogen burner. A target fiber diameter of the GRIN lens fiber to be drawn is set to 124.5 µm, which has already been input to the automatic controller 6.

By securing an end of the silica rod 10 to a lower end of the ascending/descending device 3, the preform 7 is vertically attached to the ascending/descending device 3.

The temperature of the heating furnace is increased up to a specified temperature so as to stabilize the inner temperature thereof.

Descent of the ascending/descending device 3 is started and then stopped when a sensor (not shown) detects part of the ascending/descending device 3 at a specified position. With the ascending/descending device 3 at this position, a border between the preform 7 and the weight 9 (fused portion 11) comes close to the center of the heating portion of the heater 2. This state is illustrated in FIGS. 1 and 3.

Figure 3:
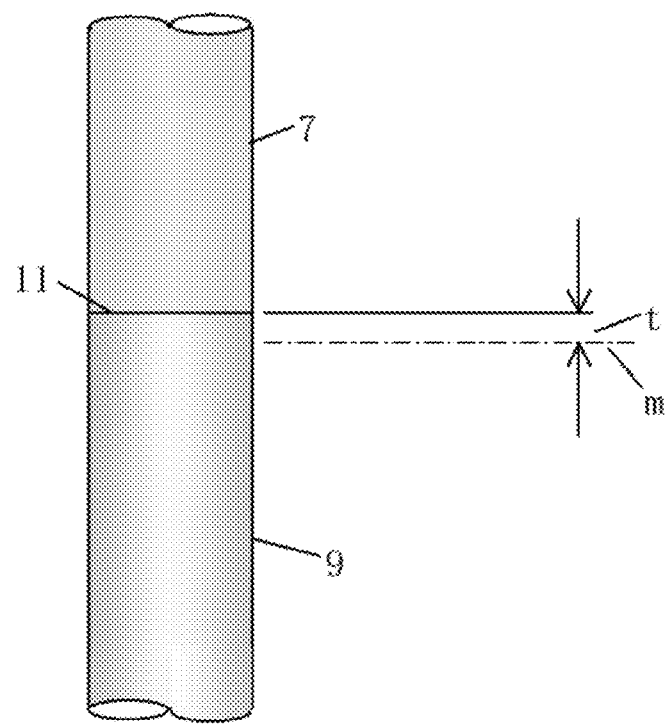
FIG. 3 is an explanatory view of a positional relationship of a maximum temperature portion m of a heating furnace and a fused portion 11 where a preform 7 and a weight 9 are fused to each other.

As illustrated in FIG. 3, the height of the fused portion 11 where the preform 7 and the weight 9 are fused to each other is positioned higher than a maximum temperature portion m (that is, the center height of the heating portion of the heater 2) of the heating furnace by t. In the present embodiment, t=2 mm.

Figure 2:
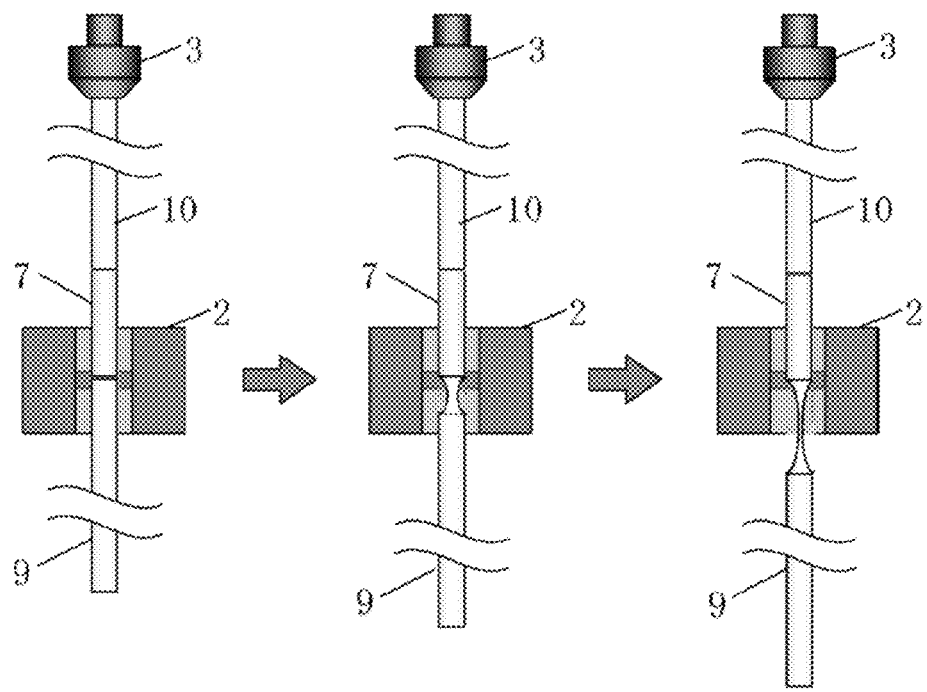
FIG. 2 is an explanatory view of a state when elongation of the preform is started.

The preform is heated, a region near the fused portion 11 where the preform 7 and the weight 9 are fused to each other is softened, and elongation starts. This state is illustrated in FIG. 2. In FIG. 2, a diagram on the left illustrates a state before the elongation starts, a diagram in the center illustrates a state at the start of the elongation, and a diagram on the right illustrates a further elongated state. The elongation starts in a central part of the heater 2, that is, a part around a position 2 mm below the fused portion 11. This part is the weight 9 formed of silica glass, and the preform 7 is elongated afterward. However, since it takes time from the start of the elongation to stabilization of drawing at a specified fiber diameter. Therefore, the preform may be drawn after the fiber diameter has been stabilized. Before the fiber diameter is stabilized, the silica glass of the weight is drawn. This can prevents the preform from being unnecessarily drawn.

When the preform has been elongated to some degree, the ascending/descending device 3 is started to descend at a constant speed. This descending speed is a constant speed that matches to the drawing speed of the GRIN lens fiber. In the present embodiment, the speed is 4 mm/minute.

When the weight 9 is descended near the winding drum 4, the weight 9 is detached, a lower end of an elongated part is attached to the winding drum 4 using adhesive tape, and winding and drawing begin.

In the present embodiment, it takes about 30 to 60 seconds on average from a stage illustrated in FIG. 1 to a stage in which the end of the elongated part has been attached to the winding drum 4 using the adhesive tape. Compared to the related-art method in which the weight is not welded, the time required is decreased to about $\frac{1}{10}$.

In addition, the preform lost before the start of drawing is about 3 to 5 mm in terms of the length of the preform. Thus, the loss is significantly reduced compared to the related-art method in which 12 to 18 mm of the preform is lost.

The invention claimed is:

1. A method for drawing a GRIN lens fiber, the method comprising:
    positioning a preform in a heating furnace, a weight being fused to a lower end of the preform at a fused portion, such that the fused portion is positioned 1 mm to 3 mm above a maximum temperature portion of the heating furnace; and
    starting drawing of the preform by heating the fused portion where the preform and the weight are fused to each other and allowing a force of gravity on the weight to draw the preform.

2. The method of claim 1, wherein the weight is made of silica.

3. The method of claim 2, wherein the weight has a rod shape with a circular cross section.

4. The method of claim 3, wherein the weight weighs 5 to 15 grams.

5. The method of claim 1, wherein the weight has a rod shape with a circular cross section.

6. The method of claim 5, wherein the weight weighs 5 to 15 grams.

7. The method of claim 1, wherein the weight weighs 5 to 15 grams.

8. A method for drawing a GRIN lens fiber, the method comprising:
    positioning a preform in a heating furnace, a weight being fused to a lower end of the preform at a fused portion, such that the fused portion is positioned above a maximum temperature portion of the heating furnace; and
    starting drawing of the preform by heating the fused portion where the preform and the weight are fused to each other and allowing a force of gravity on the weight to draw the preform.

9. The method of claim 8, wherein the weight is made of silica.

10. The method of claim 9, wherein the weight has a rod shape with a circular cross section.

11. The method of claim 10, wherein the weight weighs 5 to 15 grams.

* * * * *